United States Patent …

(12) United States Patent
Parker

(10) Patent No.: US 8,627,613 B2
(45) Date of Patent: Jan. 14, 2014

(54) AVIAN NESTING DIVERTERS AND METHODS FOR USING THE SAME

(75) Inventor: Stephen M. Parker, Greensboro, NC (US)

(73) Assignee: Tyco Electronics Corporation, Berwyn, PA (US)

( * ) Notice: Subject to any disclaimer, the term of this patent is extended or adjusted under 35 U.S.C. 154(b) by 314 days.

(21) Appl. No.: 13/224,761

(22) Filed: Sep. 2, 2011

(65) Prior Publication Data

US 2013/0055657 A1 Mar. 7, 2013

(51) Int. Cl.
*A01K 3/00* (2006.01)

(52) U.S. Cl.
USPC .......................................................... 52/101

(58) Field of Classification Search
USPC ................. 52/101, 24, 58, 97, 170, 408, 517, 52/741.1, 651.07; 119/52.3; 174/5, 135, 174/138, 139
See application file for complete search history.

(56) References Cited

U.S. PATENT DOCUMENTS

| | | | | |
|---|---|---|---|---|
| 732,582 | A * | 6/1903 | McKay | 248/75 |
| 881,682 | A * | 3/1908 | Harrison et al. | 174/5 R |
| 992,738 | A | 5/1911 | Marshall | |
| 1,141,674 | A * | 6/1915 | Withers | 174/5 R |
| 1,180,729 | A | 4/1916 | Marshall | |
| 1,729,691 | A * | 10/1929 | Smith | 174/140 H |
| 2,258,803 | A | 10/1941 | Peles | |
| 2,456,731 | A * | 12/1948 | Peles | 52/101 |
| 2,963,125 | A * | 12/1960 | Finneburgh, Jr. | 52/697 |
| 3,042,736 | A * | 7/1962 | Salisbury | 174/5 R |
| 3,148,417 | A * | 9/1964 | Bellas | 52/101 |
| 3,222,451 | A * | 12/1965 | Gormley | 174/70 R |
| 3,328,511 | A * | 6/1967 | Cagle et al. | 174/45 R |
| 3,416,266 | A * | 12/1968 | Eron | 52/101 |
| 4,359,844 | A | 11/1982 | Hoggard et al. | |
| 4,404,778 | A | 9/1983 | Ushimaru | |
| 4,823,022 | A * | 4/1989 | Lindsey | 307/149 |
| 4,841,914 | A | 6/1989 | Chattan | |
| 5,092,088 | A | 3/1992 | Way | |
| 5,299,528 | A | 4/1994 | Blankenship | |

(Continued)

FOREIGN PATENT DOCUMENTS

| | | | |
|---|---|---|---|
| JP | 09028267 A | 2/1997 | |
| JP | 09028268 A | 2/1997 | |
| WO | WO 2007/106051 A1 | 9/2007 | |

OTHER PUBLICATIONS

"Raysulate Raptor Cover BCIC for Horizontal Post and Pin Applications" TE Connectivity Energy, 2011 Tyco Electronics Corporation (2 pages).

(Continued)

*Primary Examiner* — Mark Wendell
*Assistant Examiner* — Keith Minter
(74) *Attorney, Agent, or Firm* — Myers Bigel Sibley & Sajovec, PA

(57) ABSTRACT

An avian nesting diverter system for inhibiting a bird from building a nest on a structure includes a base and a spring member. The base is adapted to be mounted on the structure. The spring member has first and second ends. The first and second ends are secured to the base and the spring member extends over the base. The spring member presents a resilient, unstable platform for a bird attempting to perch on the spring member. The spring member also presents an impediment to a bird attempting to perch on the base.

20 Claims, 7 Drawing Sheets

(56) References Cited

U.S. PATENT DOCUMENTS

| | | | |
|---|---|---|---|
| 5,606,830 A | 3/1997 | Townsend, Jr. et al. | |
| 5,850,808 A * | 12/1998 | Burdick | 119/713 |
| 5,873,324 A | 2/1999 | Kaddas et al. | |
| 5,974,998 A | 11/1999 | Gregg, III | |
| 6,115,988 A * | 9/2000 | Reisdorff | 52/741.14 |
| 6,250,023 B1 | 6/2001 | Donoho | |
| 6,255,597 B1 * | 7/2001 | Bowling et al. | 174/138 F |
| 6,418,674 B1 * | 7/2002 | Deraedt | 52/101 |
| 6,640,506 B2 * | 11/2003 | Landers | 52/101 |
| 6,730,852 B1 | 5/2004 | Puigcerver et al. | |
| 6,812,400 B1 * | 11/2004 | Lynch | 174/5 R |
| 7,154,035 B2 * | 12/2006 | Pringle | 174/5 R |
| 7,937,896 B1 | 5/2011 | Lippie | |
| 8,104,235 B2 * | 1/2012 | McCulloch et al. | 52/101 |
| 8,376,600 B2 * | 2/2013 | Bartol et al. | 362/557 |
| 8,434,274 B2 * | 5/2013 | Anderson, Jr. | 52/101 |
| 2002/0117313 A1 | 8/2002 | Spencer | |
| 2003/0010528 A1 * | 1/2003 | Niles | 174/137 A |
| 2004/0040225 A1 | 3/2004 | Finkelstein | |
| 2005/0144853 A1 | 7/2005 | Sabine | |
| 2005/0210769 A1 | 9/2005 | Harvey | |
| 2006/0096182 A1 | 5/2006 | Donoho | |
| 2010/0251633 A1 | 10/2010 | Sabine et al. | |
| 2010/0263302 A1 | 10/2010 | Lynch | |

OTHER PUBLICATIONS

*Live Wire*, Choptank Electric Cooperative, Inc., Dec. 2003, vol. 8, No. 11, Denton, Maryland (4 pages).

Notification of Transmittal of the International Search Report and the Written Opinion of the International Searching Authority, mailed on Jul. 9, 2013 in corresponding PCT Application No. PCT/US2012/052681 (11 pages).

* cited by examiner

AVIAN NESTING DIVERTERS AND METHODS FOR USING THE SAME

FIELD OF THE INVENTION

The present invention relates to protective guards and, more particularly, to wildlife guards for power distribution lines.

BACKGROUND OF THE INVENTION

Electrical equipment, such as power transmission lines, insulators, surge arrestors, switchgear and transformers (e.g., operating at voltages in excess of 1 kV and particularly in excess of 10 kV, such voltages hereinafter being referred to as "high voltage"), often have parts thereof or parts associated therewith that are not insulated from the surrounding air. Thus, an exposed portion of such equipment can be at high voltage and be longitudinally separated from another portion at low voltage, for example at earth potential. The exposed high voltage portion may be physically supported by an insulator, for example when an overhead power line is mounted on an insulator that spaces it from a supporting tower that is itself at earth potential, or for example when a high voltage cable is terminated at a bushing or switchgear whose metal housing is at earth potential. In such instances outdoors, larger wildlife such as birds with large wingspans may be big enough to form a direct bridge (i.e., an electrical short circuit) between the high voltage equipment and earth potential, with serious, usually fatal, consequences for themselves and often with serious consequences for the electrical equipment and the supply of electrical power—usually at least a fuse is actuated or a circuit breaker triggered such that the power supply is interrupted.

Birds nesting on distribution power poles have in particular become quite a problem for utilities. Large birds, like ospreys and eagles, can create nests so large that they cause flashovers when the nests touch phase to phase or phase to ground. Repair of the line, customer power outages, pole fires and bird mortality are all major concerns.

SUMMARY OF THE INVENTION

According to embodiments of the present invention, an avian nesting diverter system for inhibiting a bird from building a nest on a structure includes a base and a spring member. The base is adapted to be mounted on the structure. The spring member has first and second ends. The first and second ends are secured to the base and the spring member extends over the base. The spring member presents a resilient, unstable platform for a bird attempting to perch on the spring member. The spring member also presents an impediment to a bird attempting to perch on the base.

According to method embodiments of the present invention, a method for inhibiting a bird from building a nest on a structure includes providing an avian nesting diverter including: a base adapted to be mounted on the structure; and a spring member having first and second ends. The first and second ends are secured to the base and the spring member extends over the base. The method further includes mounting the avian nesting adapter on the structure, including securing the base to the structure. The spring member presents a resilient, unstable platform for a bird attempting to perch on the spring member, and also presents an impediment to a bird attempting to perch on the base.

According to embodiments of the present invention, an avian nesting diverter system for inhibiting a bird from building a nest on a structure includes a base and a spring member. The base is adapted to be mounted on the structure. The base includes a bottom wall and opposed side walls. The side walls extend convergently from the bottom wall to a peak such that the base has a substantially triangular cross-sectional shape. The spring member extends over the base. The spring member presents a resilient, unstable platform for a bird attempting to perch on the spring member, and also presents an impediment to a bird attempting to perch on the base.

Further features, advantages and details of the present invention will be appreciated by those of ordinary skill in the art from a reading of the figures and the detailed description of the preferred embodiments that follow, such description being merely illustrative of the present invention.

DETAILED DESCRIPTION OF EMBODIMENTS OF THE INVENTION

Figure 1:
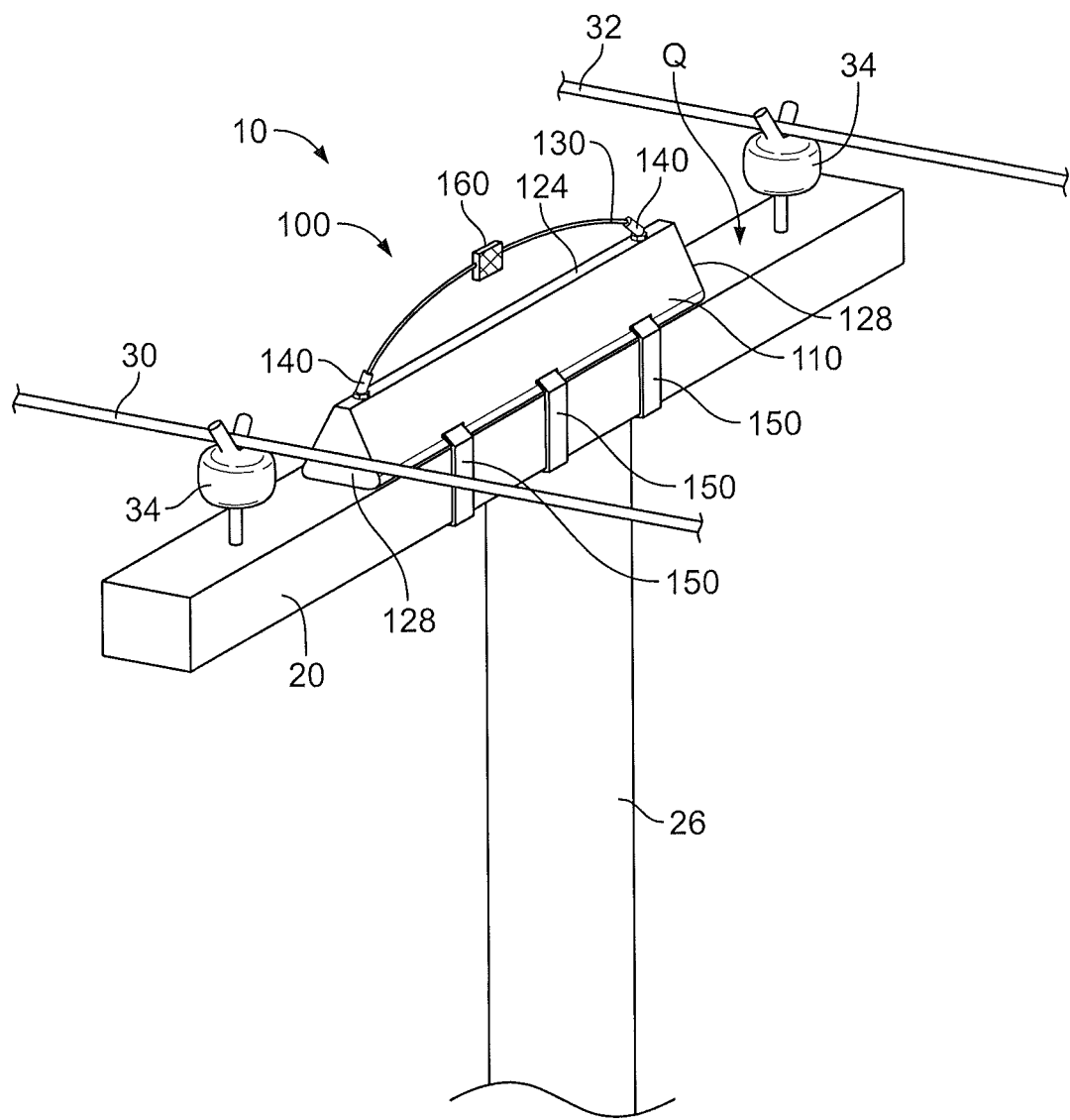
FIG. 1 is a top perspective view of an avian nesting diverter according to embodiments of the present invention mounted on a cross-arm with a pair of electrical power transmission conductors.

The present invention now will be described more fully hereinafter with reference to the accompanying drawings, in which illustrative embodiments of the invention are shown. In the drawings, the relative sizes of regions or features may be exaggerated for clarity. This invention may, however, be embodied in many different forms and should not be construed as limited to the embodiments set forth herein; rather, these embodiments are provided so that this disclosure will be thorough and complete, and will fully convey the scope of the invention to those skilled in the art.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90° or at other orientations) and the spatially relative descriptors used herein interpreted accordingly.

As used herein, the singular forms "a", "an" and "the" are intended to include the plural forms as well, unless expressly stated otherwise. It will be further understood that the terms "includes," "comprises," "including" and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. As used herein, the term "and/or" includes any and all combinations of one or more of the associated listed items.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

As used herein, "monolithic" means an object that is a single, unitary piece formed or composed of a material without joints or seams.

With reference to FIGS. 1-4, an avian nesting diverter system 10 according to embodiments of the present invention is shown therein. The system 10 includes an avian nesting diverter 100 and may further include one or more cooperating conductor covers 170 as shown in FIG. 5, for example.

In the illustrated embodiment (FIG. 1), a pair of energized electrical conductors 30, 32 each extend across and are supported by a respective insulator such as a bushing 34 and the bushings 34 are mounted on a support in the form of an elongate cross-arm 20 mounted on a utility pole 26, for example. The bushings 34, which are typically formed of porcelain or other electrically insulative material, electrically shield the conductor 30 from the support 26 and/or other electrically conductive components (e.g., which may be at earth potential). When installed on the cross-arm 20, the avian nesting diverter 100 serves to inhibit birds from perching on the cross-arm between the conductors 30, 32 and thereby provides an effective deterrent or obstacle to birds building nests or engaging in other activities that may result in the birds bridging from earth to high voltage.

The avian nesting diverter 100 includes a base 110, a spring member 130, anchors 140, clamps 150, and a reflector 160.

Figure 2:
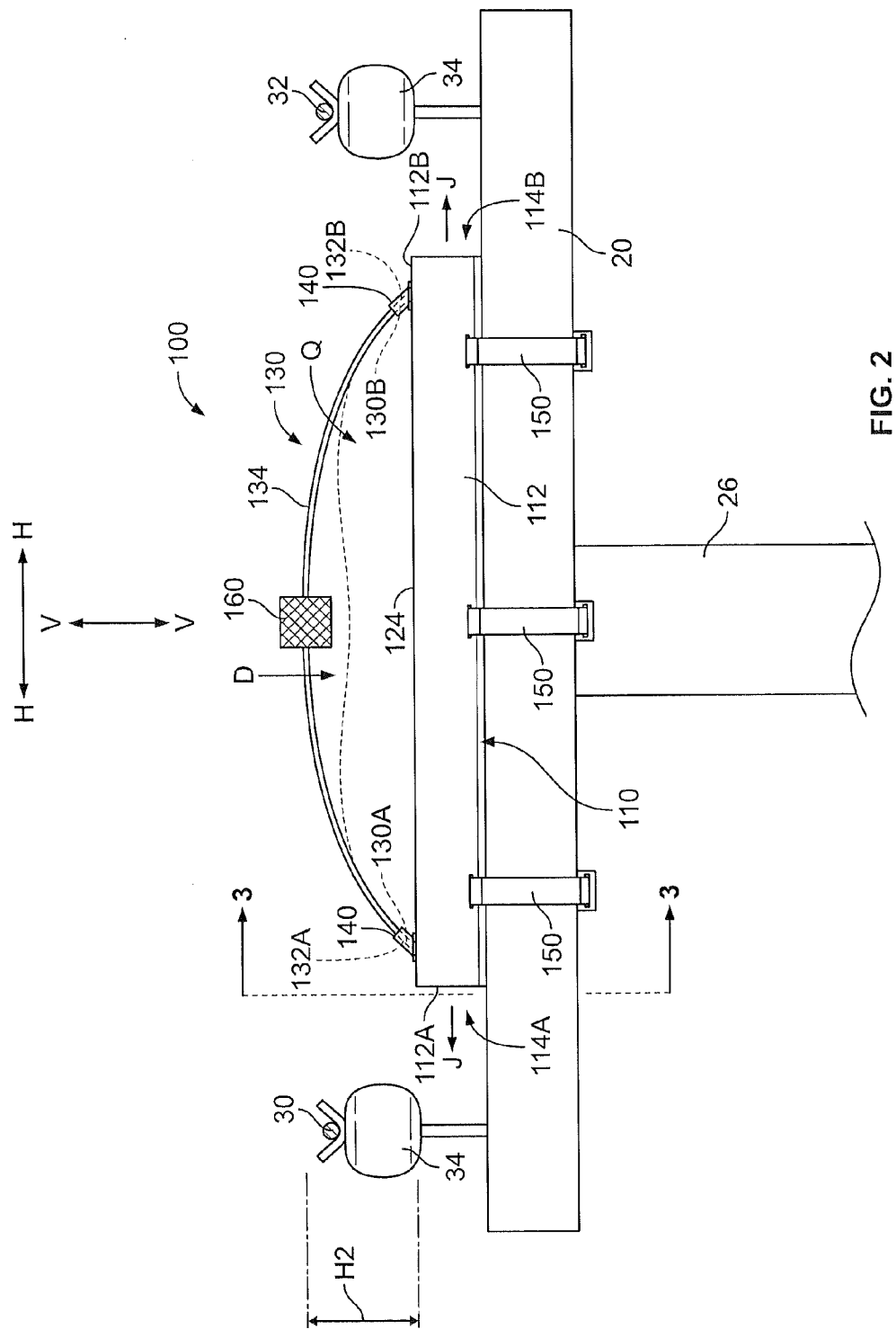
FIG. 2 is a side view of the avian nesting diverter, cross-arm and conductors of FIG. 1.
Figure 3:
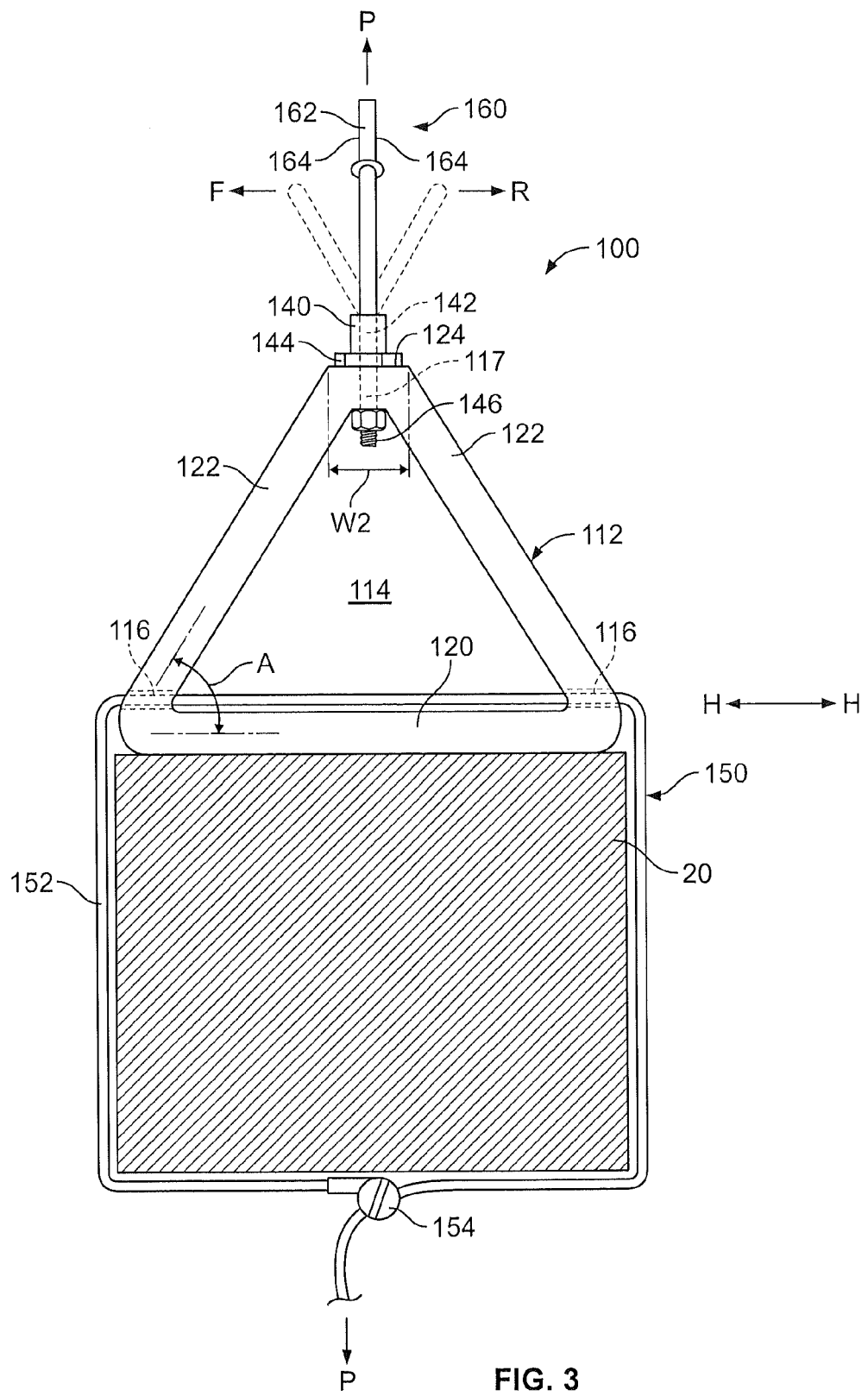
FIG. 3 is a cross-sectional view of the avian nesting diverter and cross-arm of FIG. 1 taken along the line 3-3 of FIG. 2.

The base 110 includes an elongate main body or base member 112 and a pair of end caps 128. The base member 112 has a lengthwise axis J-J (FIG. 2) and longitudinally spaced apart opposed ends 112A, 112B. A passage 114 (FIG. 3) extends through the base member 112 and terminates at openings 114A and 114B (FIG. 2) at the ends 112A and 112B, respectively. The end caps 128 (FIG. 1) are mounted in each opening 114A, 114B to close off the passage 114. In FIG. 3, the base 110 is shown with the end caps 128 removed.

Figure 4:
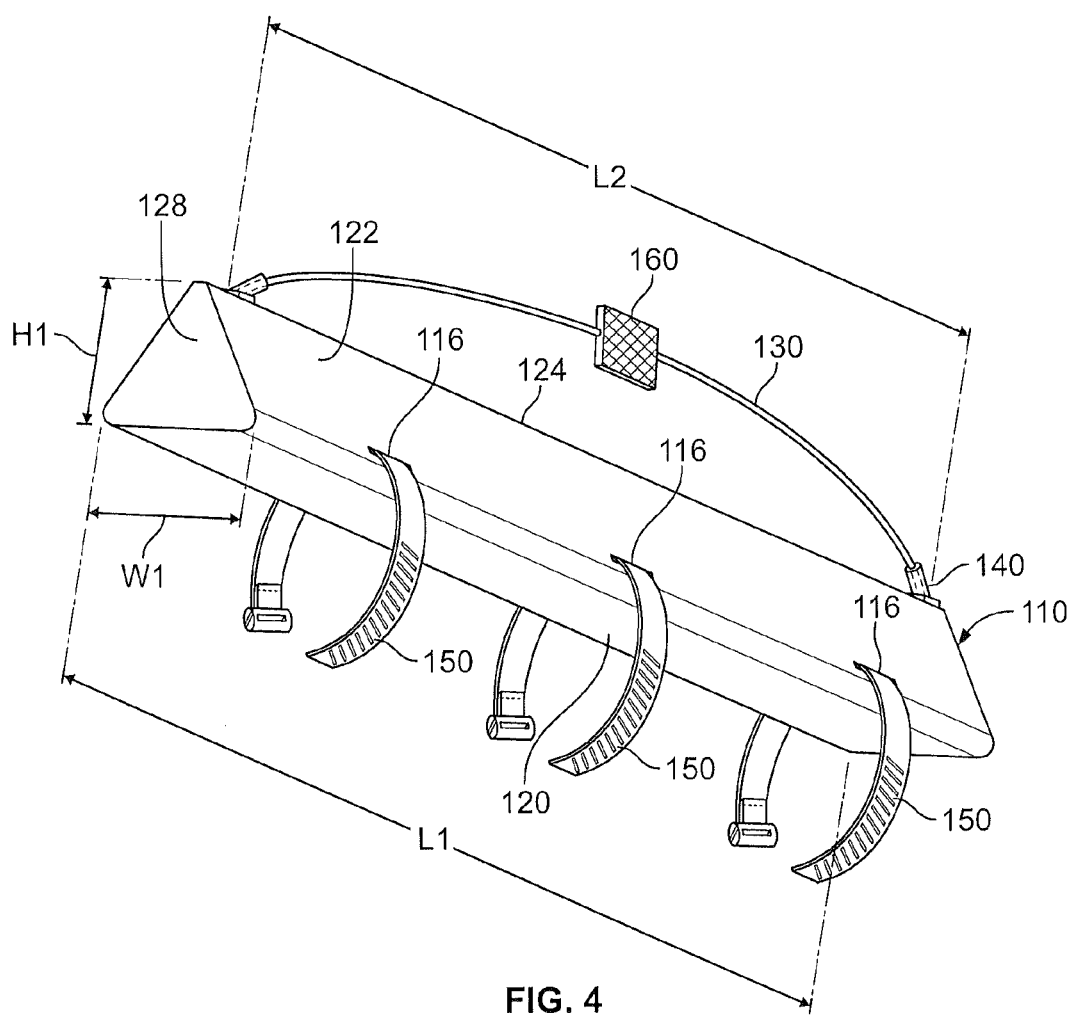
FIG. 4 is a bottom perspective view of the avian nesting diverter of FIG. 1.
Figure 5:
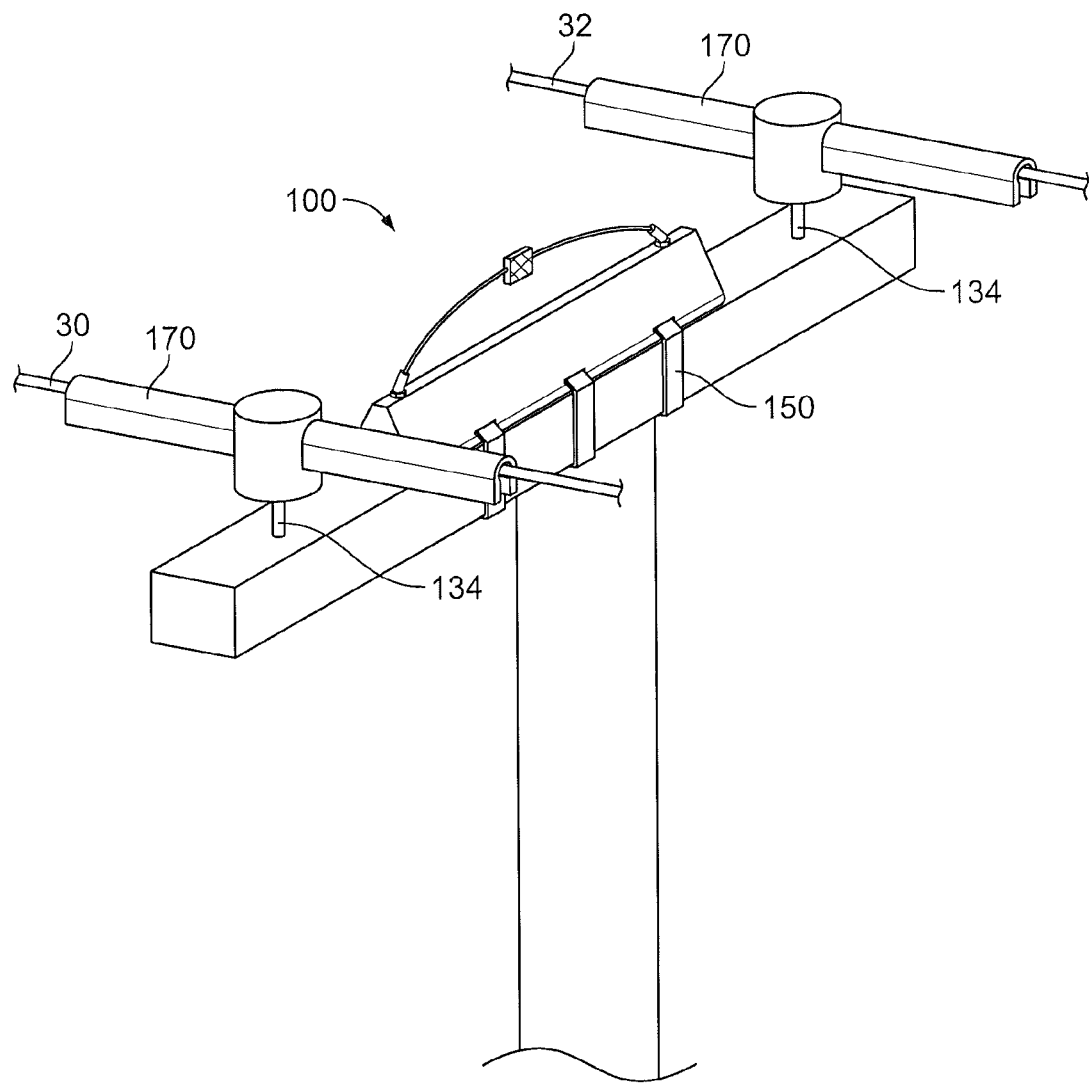
FIG. 5 is a top perspective view of an avian nesting diverter system according to further embodiments of the present invention mounted on a cross-arm with a pair of electrical power transmission conductors.

With reference to FIGS. 3 and 4, the base member 112 has a planar bottom wall 120 and planar opposed side walls 122. The side walls 122 are each sloped with respect to horizontal H-H. The side walls 122 extend upwardly from opposed longitudinal edges of the bottom wall 120 and converge to a peak in the form of an elongate, longitudinally extending top ridge 124. The top ridge 124 may be a substantially sharp or rounded ridge, or may include a generally planar, relatively narrow top platform as shown. The base 110 has a substantially triangular, truncated triangular (i.e., truncated on top by the narrow top platform of the top ridge 124) or trapezoidal shape or profile in cross-section (taken perpendicular to the longitudinal axis L-L or end view).

According to some embodiments, the base 110 has a length L1 (FIG. 4) in the range of from about 12 to 48 inches. According to some embodiments, the base 110 has a height H1 (FIG. 4) in the range of from about 3 to 5 inches. According to some embodiments, the ratio of the length L1 to the height H1 is at least 3:1 and, in some embodiments, is in the range of from about 3:1 to 5:1. According to some embodiments, the base 110 has a maximum width W1 (FIG. 4; the width of the bottom wall 120) in the range of from about 2.75 to 4.5 inches. According to some embodiments, the width W2 (FIG. 3) of the top ridge 124 is less than 1.5 inches and, according to some embodiments, is in the range of from about 0.5 to 1.5 inches.

According to some embodiments, the opposed side walls 122 form the same angle with respect to the bottom wall 120 and the base 110 defines an equilateral or isosceles triangle in cross-section (which may be truncated by the top ridge 124). According to some embodiments, the exposed outer surface of each side wall 122 defines an included angle A with respect to horizontal H-H of at least 35 degrees when the avian nesting diverter 100 is installed with the bottom wall 120 horizontally oriented and, according to some embodiments, in the range of from about 35 and 50 degrees.

A series of mounting openings 116 are formed in each side wall 122. A pair of openings 117 (FIG. 3) are formed in the top ridge 124.

The base 110 (including the base member 112 and the end caps 128) may be formed of any suitable electrically insulative material. The material may be weather resistant. According to some embodiments, the base 110 is formed of a polymeric material. According to some embodiments, the base 110 is formed of a track resistant, insulating grade, UV stable polymer. The base 110 may be formed of a rigid or semi-rigid material. In some embodiments, the material has a secant modulus of at least 10,000 psi and/or a tensile strength in the range of from about 1450 to 2450 psi. According to some embodiments, the base 110 is formed of low density polyethylene (LDPE).

According to some embodiments, the base member 112 is integrally formed. According to some embodiments, the base member 112 is monolithic. According to some embodiments, the base member 112 is unitarily molded (e.g., injection molded) or extruded.

The anchors 140 (FIG. 3) each include a bore 142, a base 144 and a fastener 146 (e.g., a nut and bolt). Each anchor 140 is secured at or adjacent a respective end 112A, 112B of the base member 112 via its base 144 and fastener 146 (which extends through an anchor opening 117 in the base 112).

The spring member 130 is an elongate, resiliently deformable member in the form of an elongate rod. The spring member 130 has an opposed ends 130A, 130B (FIG. 2). End sections 132A and 132B are located at the first and second ends 130A and 130B, respectively, and a midsection 134 extends between the end sections 132A, 132B. The end sections 132A, 132B are each seated in a respective one of the anchor bores 142 so that the opposed ends 130A and 130B of the spring member 130 are secured adjacent the ends 112A and 112B, respectively, of the base member 112. The end sections 132A, 132B may be secured in the anchor bores 142 by fasteners, adhesive, welding, interference fit, geometric interlock or any other suitable method.

According to some embodiments, the spring member 130 has a diameter in the range of from about 0.1875 to 0.675 inch. According to some embodiments, the spring member 130 has a substantially uniform cross-sectional profile from end 130A to end 130B.

The spring member 130 may be formed of any suitable material. According to some embodiments, the spring member 130 is formed of a rigid or semi-rigid, electrically insulative material. The material may be weather resistant. According to some embodiments, the spring member 130 is formed of a polymeric material. According to some embodiments, the spring member 130 is formed of a track resistant, insulating grade, UV stable polymer. In some embodiments, the material has a secant modulus of at least 25,000 psi and/or a tensile strength in the range of from about 1450 to 2450 psi.

In some embodiments, the spring member 130 is formed of fiberglass (glass-reinforced polymer (GRP)). However, other suitable materials may be used, such as a wire, which may be formed of or covered by an electrically insulative material.

According to some embodiments, the spring member 130 is integrally formed. According to some embodiments, the spring member 130 is monolithic. According to some embodiments, the spring member 130 is unitarily molded (e.g., injection molded) or extruded.

The spring member midsection 134 extends over and vertically spaced apart from the base member 112. According to some embodiments, the longitudinal path of the midsection 134 is substantially parallel to the top ridge 124. In some embodiments and as illustrated, the midsection 134 is bowed and defines an arc. According to some embodiments, the arc has a radius in the range of from about 10 to 40 inches.

According to some embodiments, the spring member 130, when mounted in the anchors 140 as shown, is resiliently bent into the arc relative to its relaxed state (which may be linear).

According to some embodiments, the distance L2 (FIG. 4) between the ends 130A and 130B is in the range of from about 75 to 100 percent of the length L1. According to some embodiments, the spring member 130 and the base 110 are substantially longitudinally coextensive (i.e., the spring member 130 spans the full length of the base 110). In some embodiments and as shown, the spring member 130 extends fully directly vertically above the base member 112 and, according to some embodiments, extends fully directly vertically above the top ridge 124 in a plane P-P (FIG. 3).

According to some embodiments, the maximum distance 112 (FIG. 2) between the base member 112 and the spring member 130 is in the range of from about 2 to 6 inches.

The reflector 160 (FIG. 3) includes a substrate 162 affixed to the midsection 134, and light reflective elements 164 disposed on either side of the substrate 162. The reflective elements 164 may include mirrors and/or lenses.

Each clamp 150 (FIG. 3) includes a strap 152 and an adjustable coupling 154. The clamps 150 may be screw/band (worm gear) clamps, for example. Other suitable clamps or other fastening devices may be used in addition to or in place of the clamps 150. According to some embodiments, the straps 152 are formed of metal, such as steel.

The avian nesting diverter 100 may be installed and used as follows in accordance with method embodiments of the present invention. The avian nesting diverter 100 may be preassembled at the factory and provided to the field technician in the configuration as shown in FIG. 4, for example. Alternatively, one or more components of the avian nesting diverter 100 may be provided unassembled and then assembled in the field. For example, the field technician may select and insert clamps 150 of the appropriate length into the base 110.

The base 110 is placed on the top of the cross-arm 20 in a region Q between the conductors 30, 32. Each clamp 150 is routed through an opposed set of the mount openings 116 and the passage 114 proximate the bottom wall 120 and around the cross-arm 20 as shown in FIGS. 1-3. The ends of each clamps strap 152 are coupled by the associated coupling 154 and the coupling 154, is used to cinch the strap 152 tight about the cross-arm 20. The avian nesting diverter 100, as shown in FIGS. 1-3, is now deployed and ready for service.

In service, multiple aspects or features of the avian nesting diverter 100 may inhibit, deter or prevent a bird (in particular, a bird having a large wingspan) from perching on and building a nest on the cross-arm in the region Q. Because the side walls 122 are relatively steeply sloped with respect to vertical and the top of the base 110 forms a narrow top ridge 124, the "platform" area that a bird can perch or build a nest on is very narrow. This shape helps to shed any nesting materials before a foundation can be established.

The spring member 130 is configured such that, when a sufficient load (weight) exceeding a prescribed load is applied to it from above, the spring member 130 will tend to deflect and/or deform downwardly (in a direction D; FIG. 2) and/or out of the plane P-P (e.g., in deflection directions F and R, FIG. 3) as indicated by dashed lines in FIGS. 2 and 3. The required or prescribed load is selected to provide such deflection when a bird of at least a targeted or intended weight attempts to perch on the spring member 130. A large bird landing on the spring member 130 will have difficulty maintaining its balance on the small, unstable spring member 130.

If a bird successfully lands on the top ridge 124, the spring member 130 (with the gap height H2 being less than the height of the tallest intended or targeted bird) will present an obstacle to the bird standing or remaining in this location. While the spring member 130 is sufficiently flexible and resilient to deflect or collapse under the weight of a bird, according to some embodiments, it also has sufficient rigidity that it resists displacement by the bird perched on the top ridge 124. If the bird is nonetheless able to deflect (e.g., laterally deflect) the spring member 130, the spring member 130 will exert a significant pressure or bias against the bird tending to force the bird off the base 110.

The reflector 160 may tend to deter a bird from perching or nesting on the cross-arm 20. The reflector 160 may scare or cause the bird concern. In some embodiments, the spring member 130 is configured to move or oscillate in response to wind forces, which in turn causes the reflector 160 to become a dynamic reflector that moves and effectively flashes light to the bird, thereby generating elevated concern.

As shown in FIGS. 1-3, the clamps 150 are each positioned entirely near the bottom of the base 110 so that no portions thereof extend exposed over the top of the base 110 (i.e., over the top ridge 124 or the adjacent regions). This configuration keeps the electrically conductive clamps 152 away from the locations (i.e., touch points) where the bird may land. This may be beneficial in case the cross-arm 20 is electrically grounded.

With reference to FIG. 5, the avian nesting diverter system 10 may further include electrically insulative conductor covers 170 mounted on the conductors 30, 32 and the bushings 34. The covers 170 may include Raysulate™ covers available from TE Connectivity, for example.

Figure 6:
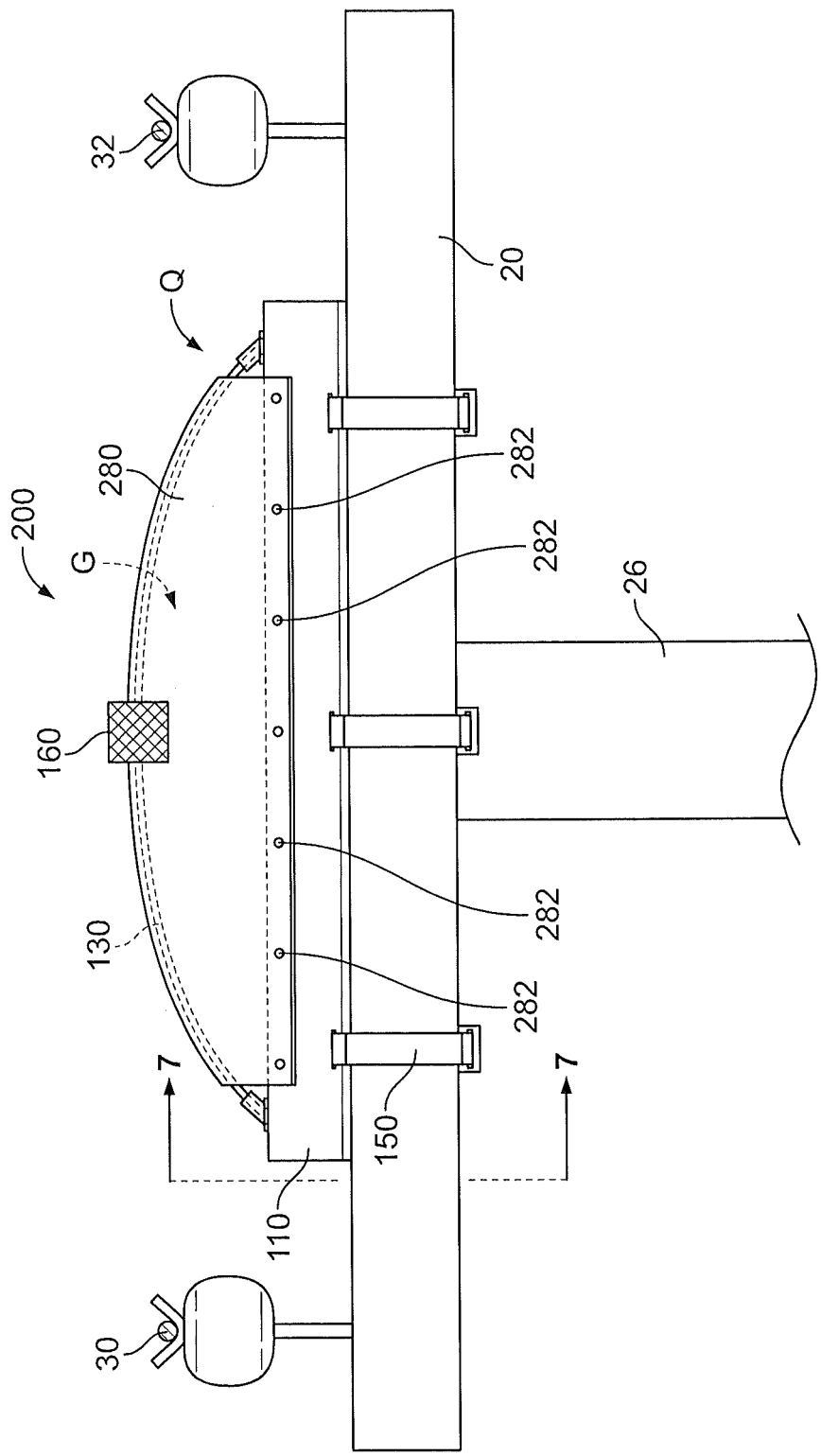
FIG. 6 is a side view of an avian nesting diverter according to further embodiments of the present invention mounted on a cross-arm with a pair of electrical power transmission conductors.
Figure 7:
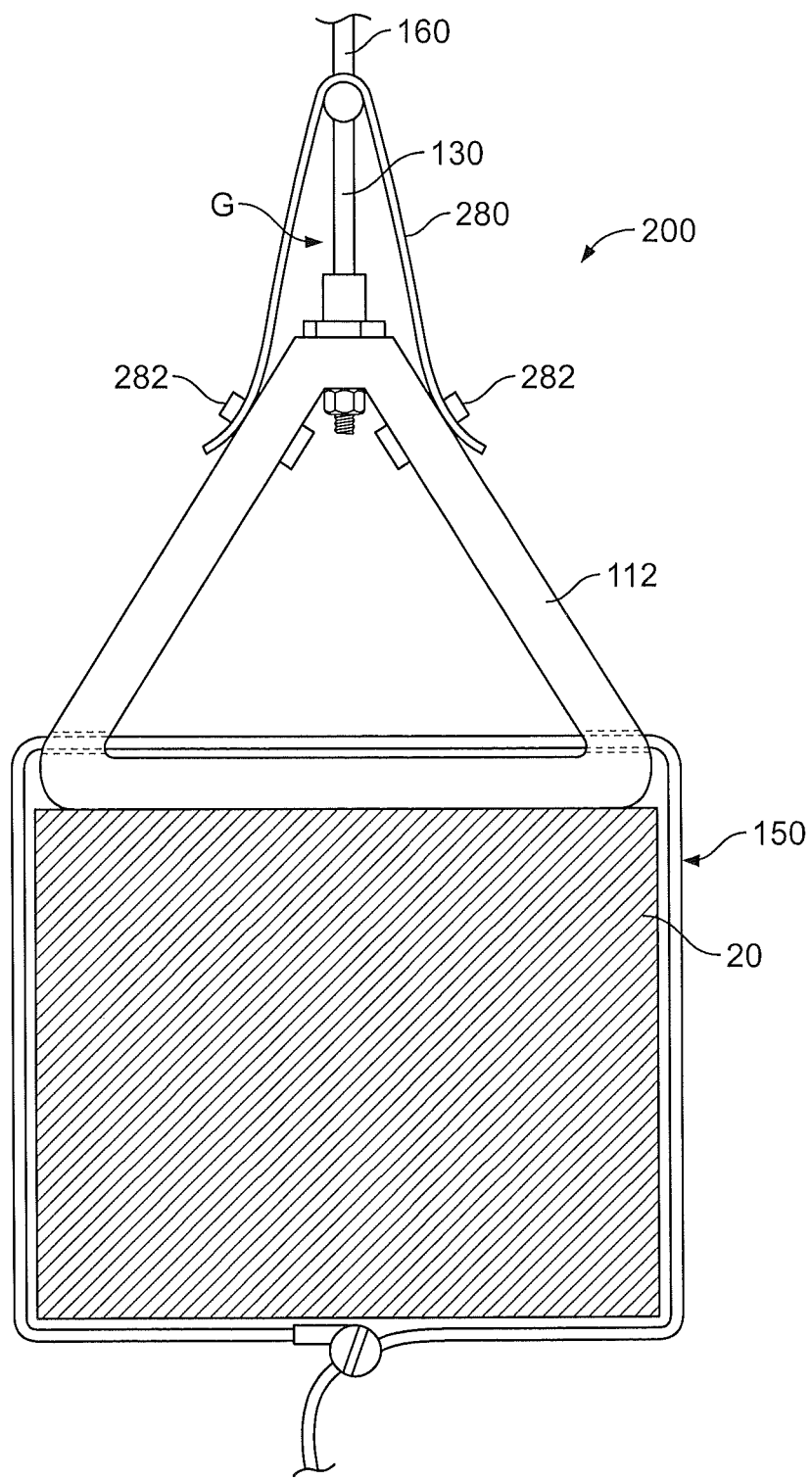
FIG. 7 is a cross-sectional view of the avian nesting diverter and cross-arm of FIG. 6 taken along the line 7-7 of FIG. 6.

With reference to FIGS. 6 and 7, an avian nesting diverter 200 according to further embodiments of the present invention is shown therein. The avian nesting diverter 200 includes the components of the avian nesting diverter 100 (which are indicated in FIGS. 6 and 7 with the same numerals), and further includes a shield 280. The shield 280 includes a flexible, compliant cover, web, film or sheet that extends between the spring member 130 and the base 110 to block or inhibit access by a bird to the gap region G between the spring member 130 and the base member 112. As shown, the shield 280 is folded over the top of the spring member 130 and the lower edges of the shield 280 are affixed to the base 110 by fasteners 282. However, other configurations may be employed. For example, the shield 280 may be configured as a single wall or curtain that hangs from the spring member 130 and is fastened or otherwise secured to the base 110. The shield 280 may be formed of any suitable electrically insulative material. According to some embodiments, the shield 280 is formed of a polymeric material such as vinyl.

While a triangular cross-sectionally shaped base 110 has been described and shown herein, in some embodiments other shapes may be used. For example, the base may have a rectangular bottom section (with the side walls of the rectangle being substantially aligned with vertical when installed) and a triangular top section corresponding to the base 110.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention. Therefore, it is to be understood that the foregoing is illustrative of the present invention and is not to be construed as limited to the specific embodiments disclosed, and that modifications to the disclosed embodiments, as well as other embodiments, are intended to be included within the scope of the invention.

That which is claimed is:

1. An avian nesting diverter system for inhibiting a bird from building a nest on a structure, the avian nesting diverter comprising:
    a base adapted to be mounted on the structure; and
    a spring member having first and second ends, wherein the first and second ends are secured to the base and the spring member extends over the base;
    a flexible, compliant shield extending between the spring member and the base member to inhibit access by a bird to a region between the spring member and the base member;
    wherein the spring member presents a resilient, unstable platform for a bird attempting to perch on the spring member, and also presents an impediment to a bird attempting to perch on the base.

2. The avian nesting diverter of claim 1 wherein the base includes a bottom wall and a peak opposite the bottom wall, the peak having a width less than a width of the bottom wall.

3. The avian nesting diverter of claim 2 wherein the peak is an elongate top ridge having a width of less than 1.5 inches.

4. The avian nesting diverter of claim 2 wherein the peak is an elongate top ridge and the base has a substantially triangular cross-sectional shape with opposed sidewalls converging from the bottom wall to the top ridge.

5. The avian nesting diverter of claim 1 wherein the base is elongate, extends lengthwise from a first end to an opposing second end, and has a length/height ratio of at least 3:1.

6. The avian nesting diverter of claim 5 wherein the first end of the spring member is attached to the base adjacent the first end of the base and the second end of the spring member is attached to the base adjacent the second end of the base.

7. A method for inhibiting a bird from building a nest on a structure, the method comprising:
    providing an avian nesting diverter including:
        a base adapted to be mounted on the structure; and
        a spring member having first and second ends, wherein the first and second ends are secured to the base and the spring member extends over the base; and
        a flexible, compliant shield extending between the spring member and the base member to inhibit access by a bird to a region between the spring member and the base member;
    mounting the avian nesting adapter on the structure, including securing the base to the structure;
    wherein the spring member presents a resilient, unstable platform for a bird attempting to perch on the spring member, and also presents an impediment to a bird attempting to perch on the base.

8. The method of claim 7 wherein the support is a cross-arm supporting an electrical power transmission conductor.

9. An avian nesting diverter system for inhibiting a bird from building a nest on a structure, the avian nesting diverter comprising:
    a base adapted to be mounted on the structure, the base including a bottom wall and opposed side walls, wherein the side walls extend convergently from the bottom wall to a peak such that the base has a substantially triangular cross-sectional shape; and
    a spring member extending over the base;
    wherein the spring member presents a resilient, unstable platform for a bird attempting to perch on the spring member, and also presents an impediment to a bird attempting to perch on the base.

10. The avian nesting diverter of claim 9 wherein the peak is an elongate top ridge having a width of less than 1.5 inches.

11. The avian nesting diverter of claim 9 wherein the base is elongate, extends lengthwise from a first end to an opposing second end, and has a length/height ratio of at least 3:1.

12. The avian nesting diverter of claim 9 wherein the base is unitary.

13. The avian nesting diverter of claim 9 wherein the base is formed of an electrically insulative material.

14. The avian nesting diverter of claim 9 wherein the spring member includes a bowed elongate rod.

15. The avian nesting diverter of claim 9 wherein the spring member is formed of an electrically insulative material.

16. The avian nesting diverter of claim 9 wherein the spring member is formed of fiberglass.

17. The avian nesting diverter of claim 9 including a reflector mounted on the spring member, wherein the reflector is movable relative to the base with the spring member.

18. The avian nesting diverter of claim 9 including a metal clamp device adapted to secure the base to the structure without extending over a top edge of the base.

19. The avian nesting diverter of claim 9 including a flexible, compliant shield extending between the spring member and the base member to inhibit access by a bird to a region between the spring member and the base member.

20. The avian nesting diverter of claim 9 further including an electrically insulative conductor cover adapted to be placed about an electrical power transmission conductor supported by the structure.

\* \* \* \* \*